United States Patent Office 2,824,888
Patented Feb. 25, 1958

2,824,888

α,α-DIFLUORO-SUBSTITUTED ACIDS OF THE TRI-CARBOXYLIC ACID CYCLE, THEIR SALTS, AMIDES AND ESTERS

Maynard S. Raasch, Wilmington, Del., assignor to E. I. du Pont de Nemours and Company, Wilmington, Del., a corporation of Delaware No Drawing. Application September 20, 1955
Serial No. 535,538

7 Claims. (Cl. 260—483)

This invention relates to a new class of organic compounds containing fluorine and to their preparation. More particularly this invention relates to new fluorine-containing carboxylic acids, their salts, amides and esters and methods for their preparation.

The tricarboxylic acid cycle, also known as the Krebs or citric acid cycle, is a key biochemical process that occurs in most living organisms and is involved in the oxidative metabolism of carbohydrates. Pyruvic acid from carbohydrate metabolism is fed into the cycle and by means of it is oxidized to carbon dioxide and water with the release of energy. Some of the compounds in the cycle also function as intermediates for other biochemical processes. The series of enzymic reactions represented by the cycle occurs in the mitochondria of cells and can be represented as follows (see Fruton and Simmonds "General Biochemistry," John Wiley and Sons, Inc., New York 1953, p. 471):

TRICARBOXYLIC ACID CYCLE

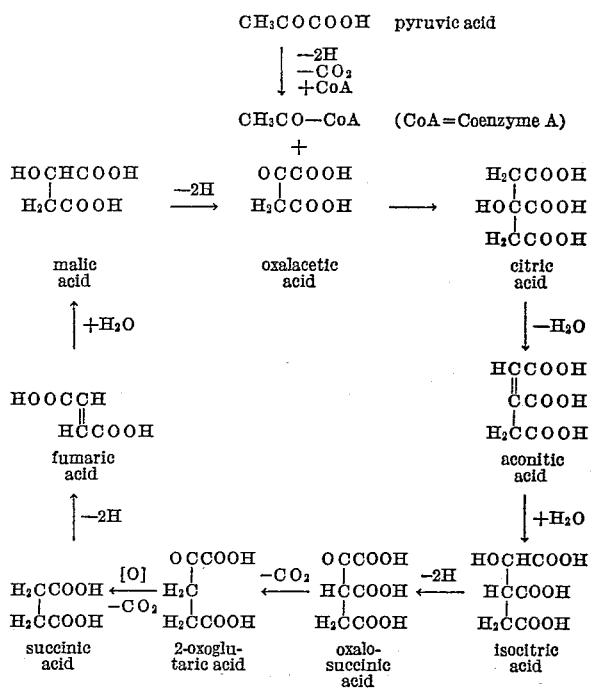

Certain analogs and derivatives of the acids in the cycle are known to be inhibitors of the cycle. Thus, malonic acid inhibits the dehydrogenation of succinic acid by interfering with the succinic dehydrogenase enzyme (Fruton and Simmonds, p. 472). Inhibition of the cycle has become of economic importance in the control of pests. Fluoroacetic acid is believed to be toxic because it is metabolized to fluorocitric acid which then blocks the cycle at the citric acid stage (Fruton and Simmonds, p. 476). However, fluoroacetic acid is extremely toxic to mammals, including humans, and therefore dangerous to use. As an index of this toxicity, the $LD_{50}$ (dosage lethal to 50% of the animals tested) for the sodium salt of fluoroacetic acid to laboratory white mice (intraperitoneal route) is only about 9–10 mg./kg. body weight.

It is an object of this invention to provide a new class of organic compounds containing fluorine and methods for their preparation. A further object is to provide new fluorine-containing carboxylic acids, their salts, amides and esters and methods for their preparation. A still further object is to provide a new class of fluorine-substituted derivatives of acids in the tricarboxylic acid cycle. Another object is to provide a new class of fluorine-containing compounds showing fungicidal, insecticidal and miticidal activity with a relatively low toxicity to mammals. Other objects will appear hereinafter.

These and other objects of this invention are accomplished by providing α,α-difluoro-substituted acids of the tricarboxylic acid cycle, their salts, amides and esters. Each member of this new class of α,α difluoro-substituted acids is derived from an acid of the tricarboxylic acid cycle having a methylene group by replacing with fluorine the hydrogens of the methylene group. These acids are otherwise unsubstituted. Thus, these new fluorine-containing acids correspond in chemical structure to the acids of the tricarboxylic acid cycle having a methylene carbon atom alpha to a carboxyl group and have directly attached to this methylene carbon atom two fluorine atoms. Although fumaric acid is an acid of the tricarboxylic acid cycle, it does not contain a methylene carbon atom and hence cannot have an α,α-difluoro-substituted acid derivative.

The new α,α-difluoro-substituted acids of this invention consist of the following eight acids:

(1) α,α-Difluorooxalacetic acid

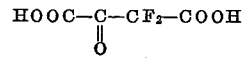

(2) α,α-Difluorocitric acid (alternatively named 2,2-difluorocitric acid)

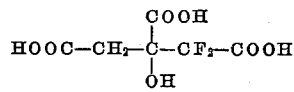

(3) α,α-Difluoroaconitic acid (alternatively named 4,4-difluoroaconitic acid)

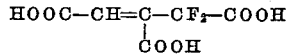

(4) α,α-Difluoroisocitric acid (alternatively named 4,4-difluoroisocitric acid)

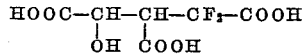

(5) α,α-Difluoro-β-oxalosuccinic acid

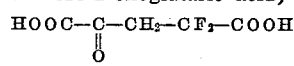

(6) α,α-Difluoro-gamma-oxoglutaric acid (alternatively named 4,4-difluoro-2-oxoglutaric acid)

HOOC—C—CH₂—CF₂—COOH
‖
O (7) α,α-Difluorosuccinic acid (alternatively named 2,2-difluorosuccinic acid)

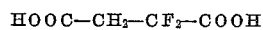

(8) α,α-Difluoromalic acid (alternatively named 3,3-difluoromalic acid)

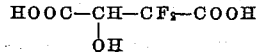

The members of this new class of α,α-difluoro acids show fungicidal, insecticidal and miticidal activity, yet have a relatively low toxicity to mammals.

It appears probable that the insecticidal and fungicidal activity which is characteristic of this class of compounds may be a manifestation of their interference with the normal operation of the tricarboxylic acid cycle, and that their greatly reduced toxicity to mammals over the known monofluoro derivatives is due to the presence of a difluoromethylene group alpha to a carboxyl group. This theory is given for a better understanding of the nature and properties of the novel compounds of this invention and obviously in no manner is to be considered as a limitation on the scope of the present invention.

The α,α-difluoro derivatives of the acids in the tricarboxylic acid cycle are illustrated in the following examples in which parts are by weight.

*Example I.—α,α-difluorooxalacetic acid*

In a glass reaction vessel fitted with stirrer, thermometer, inlet for liquid addition, and heater are placed 830 parts of diethyl oxalate and 69 parts of finely divided sodium hydride. The assembly is flushed with nitrogen and then 353 parts of ethyl difluoroacetate is added during three hours at 75–80° C. Heating is continued for five hours longer. The cooled mixture is added to 294 parts of sulfuric acid dissolved in 1500 parts of water. The organic layer is separated and the aqueous layer is extracted with ether. The organic layer and ether extract are combined and dried with magnesium sulfate and then distilled. The yield of diethyl α,α-difluorooxalacetate is 244 parts (38% of theory), B. P. 63° C./1 mm., $n_D^{25}$ 1.3972.

*Analysis.*—Calcd. for $C_8H_{10}F_2O_5$: C, 42.86; H, 4.50; F, 17.0. Found: C, 42.69; H, 4.95; F, 17.0, 17.1.

The ester is hydrolyzed by refluxing 224 parts with 1000 parts of 10% hydrochloric acid for one hour and then evaporating under vacuum. The crystalline product is washed with trifluoroacetic acid to give 151 parts (81% of theory) of α,α-difluorooxalacetic acid hydrate. It melts at 116–118° C. after recrystallization from trifluoroacetic acid.

*Analysis.*—Calcd. for $C_4H_4F_2O_6$: V, 25.82; H, 2.17; F, 20.43. Found: C, 26.08; H, 2.47; F, 20.56.

*Example II.—3,3-difluoromalic acid (α,α-difluoromalic acid)*

A mixture of 35 parts of diethyl α,α-difluorooxalacetate, 53 parts of ether and 0.5 part of ruthenium dioxide catalyst is hydrogenated at 75–80° C. and 1000–2000 lb./sq. in. hydrogen pressure. The product is filtered and distilled to give 25 parts (74% of theory) of diethyl 3,3-difluoromalate, B. P. 69–70° C./0.5 mm., $n_D^{25}$ 1.4078.

Diethyl α,α-difluorooxalacetate is also reduced to diethyl 3,3-difluoromalate by adding it to sodium borohydride in pyridine at 20–25° C.

*Analysis.*—Calcd. for $C_8H_{12}F_2O_5$: C, 42.47; H, 5.35; F, 16.80. Found: C, 42.30; H, 5.48; F, 16.8, 16.9.

The ester is hydrolyzed to 3,3-difluoromalic acid (α,α-difluoromalic acid) by refluxing 22 parts with 50 parts of 10% hydrochloric acid for three hours. Evaporation of the solution and recrystallization of the 3,3-difluoromalic acid gives 9.4 parts (57% of theory), M. P. 139–140° C.

*Analysis.*—Calcd. for $C_4H_4F_2O_5$: C, 28.25; H, 2.37; F, 22.3. Found: C, 28.66; H, 2.63; F, 21.8.

*Example III*

PART A.—TRIETHYL 2,2-DIFLUOROCITRATE (TRIETHYL α,α-DIFLUOROCITRATE)

Thirty-six parts of activated zinc dust is placed in a glass reaction vessel equipped with stirrer, reflux condenser, inlet for liquid addition, and heated by a steam bath. A portion of a mixture of 112 parts of diethyl α,α-difluorooxalacetate, 84 parts of ethyl bromoacetate and 217 parts of benzene is added. After the reaction starts, the rest of the mixture is added at a rate to produce gentle reflux. After all is added, refluxing is continued for one hour. The cooled mixture is then agitated with a solution of 83 parts of sulfuric acid in 450 parts of water. The benzene layer is washed with water, 5% sodium bicarbonate solution, and water again, dried, and distilled at 1 mm. This product is then fractionated to give 39 parts (25% of theory) of triethyl 2,2-difluorocitrate, B. P. 125–126.5° C./1 mm., $n_D^{25}$ 1.4215.

*Analysis.*—Calcd. for $C_{12}H_{18}F_2O_7$: C, 46.00; H, 5.79; F, 12.1. Found: C, 46.09; H, 5.88; F, 12.0, 12.3.

Triethyl 4,4-difluoroaconitate is made by dehydrating triethyl 2,2-difluorocitrate, as by heating with phosphorus pentoxide. Alternatively triethyl 2,2-difluorocitrate is treated with phosphorus pentabromide to replace the hydroxyl group with bromine and the product is heated with aqueous sodium hydroxide to obtain sodium 4,4-difluoroaconitate. By acidifying a solution of the salt with sulfuric acid and extracting with ether, the free 4,4-difluoroaconitic acid is obtained.

PART B.—DIETHYL 2,2-DIFLUOROCITRATE (DIETHYL α,α-DIFLUOROCITRATE)

To a mixture of 3.2 parts of malonic acid and 7 parts of pyridine is slowly added 6.7 parts of diethyl α,α-difluorooxalacetate. The mixture is then acidified with dilute sulfuric acid and extracted with ether. Evaporation of the ether leaves 7.8 g. (92% yield) of diethyl 2,2-difluorocitrate,

$HOOCCH_2C(OH)(COOC_2H_5)CF_2COOC_2H_5$

After recrystallization from ether-benzene in 84% return it melts at 113–114° C.

*Analysis.*—Calcd. for $C_{10}H_{14}F_2O_7$: C, 42.26; H, 4.96; F, 13.4. Found: C, 41.86; H, 5.13; F, 13.1.

PART C.—2,2-DIFLUOROCITRIC ACID MONOHYDRATE (α,α-DIFLUOROCITRIC ACID)

Diethyl difluorocitrate (31.2 parts) is dissolved in 75 parts of water containing 13.2 parts of sodium hydroxide and allowed to stand 65 hours at 25° C. Hydrochloric acid (d. 1.18; 35 parts) is then added and the solution is extracted with ether. The ether is dried over magnesium sulfate and evaporated to give 23 parts of syrupy difluorocitric acid. This is allowed to stand until crystalline and recrystallized from a mixture of ether and benzene. The compound is the monohydrate of 2,2-difluorocitric acid which melts at 89–90° C.

*Analysis.*—Calcd. for $C_6H_6F_2O_7 \cdot H_2O$: C, 29.28; H, 3.28; F, 15.44. Found: C, 29.38; H, 3.49; F, 15.44.

*Example IV.—2,2-difluorosuccinic acid (α,α-difluorosuccinic acid)*

STEP 1.—1,1,2 - TRICHLORO - 2,3,3 - TRIFLUOROCYCLOBUTANE FROM VINYLIDENE CHLORIDE AND CHLOROTRIFLUOROETHYLENE

A stainless steel bomb is charged with 350 parts of vinylidene chloride, 1 part of hydroquinone, and 300 parts of chlorotrifluoroethylene. The mixture is heated for 10 hours at 180° C. under autogenous pressure. The product is filtered from polymer and then distilled to give 266 parts (48% yield) of 1,1,2-trichloro-2,3,3-trifluorocyclobutane boiling at 120–121° C., $n_D^{25}$ 1.4139.

*Analysis.*—Calcd. for $C_4H_2Cl_3F_3$: C, 22.51; H, 0.95; Cl, 49.85. Found: C, 22.61; H, 1.09; Cl, 49.32.

STEP 2.—1 - CHLORO - 2,3,3 - TRIFLUOROCYCLOBUTENE FROM 1,1,2 - TRICHLORO - 2,3,3 - TRIFLUOROCYCLOBUTANE

In a glass reaction vessel fitted with an efficient reflux condenser, sealed stirrer and addition funnel are placed 150 parts of 95% zinc dust and 243 parts of absolute ethanol. The alcohol is refluxed and 400 parts of 1,1,2-trichloro-2,3,3-trifluorocyclobutane is slowly added. The mixture is refluxed for two hours after the end of the addition. The mixture is cooled and 1500 parts of water containing 25 parts of hydrochloric acid is added. The organic layer is separated, dried over calcium chloride, and distilled. The yield of 1-chloro-2,3,3-trifluorocyclobutene is 177 parts (66%), B. P. 51.5–52° C. $n_D^{25}$ 1.3614.

*Analysis.*—Calcd. for $C_4H_2ClF_3$: Cl, 24.88. Found: Cl, 24.50.

STEP 3.—2,2-DIFLUOROSUCCINIC ACID FROM 1-CHLORO-2,3,3-TRIFLUOROCYCLOBUTENE

In a glass reaction vessel fitted with stirrer, thermometer, addition funnel, and ice-salt bath are placed 4000 parts of water, 160 parts of sodium hydroxide and 316 parts of potassium permanganate. 1 - chloro-2,3,3-trifluorocyclobutene (214 parts) is added slowly at 15–20° C. The reaction is complete in three hours. The manganese dioxide is filtered off, washed with water, and the filtrate is reduced in volume on a steam bath. After addition of 312 parts of sulfuric acid, the filtrate is extracted with ether. After the ether solution has been dried with magnesium sulfate it is evaporated to give 182 parts (79% yield) of 2,2-difluorosuccinic acid. The product is recrystallized from acetone-benzene in 88% return (2 crops) and melts at 144–145° C.

*Analysis.*—Calcd. for $C_4H_4F_2O_4$: C, 31.17; H, 2.62; F, 24.66. Found: C, 30.90; H, 2.80; F, 24.68.

This acid is stable in water in contrast to α,β-difluorosuccinic acid which decomposes to acetylenedicarboxylic acid on contact with water.

2,2-difluorosuccinic acid is converted to its diethyl ester as follows:

One hundred parts of 2,2-difluorosuccinic acid, 243 parts of absolute ethanol, and 18 parts of sulfuric acid are refluxed for two hours. The alcohol is boiled off, and 243 parts more of ethanol and 9 parts of sulfuric acid are added. Refluxing is continued for 16 hours, and the alcohol is again boiled off. The product is poured into water, and the organic layer is washed with 5% sodium bicarbonate solution followed by water. After drying over magnesium sulfate and distillation, 109 parts (81% yield) of diethyl 2,2-difluorosuccinate is obtained, B. P. 53–55° C./1 mm., 205–207° C./749 mm., $n_D^{25}$ 1.3912.

*Analysis.*—Calcd. for $C_8H_{12}F_2O_4$: C, 45.71; H, 5.76; F, 18.08. Found: C, 46.10; H, 5.86; F, 18.54.

*Example V.—Dimethyl 4,4 - difluoro - 2 - oxoglutarate (dimethyl α,α-difluoro-gamma-oxoglutarate)*

STEP 1.—METHYL 2 - CHLORO - 2,3,3 - TRIFLUOROCYCLOBUTANECARBOXYLATE FROM METHYL ACRYLATE AND CHLOROTRIFLUOROETHYLENE

A stainless steel bomb is charged with 300 parts of methyl acrylate, 1 part of hydroquinone, and 300 parts of chlorotrifluoroethylene. The mixture is heated at 180° C. for 10 hours. Distillation of the product gives 383 parts of methyl 2 - chloro - 2,3,3-trifluorocyclobutanecarboxylate boiling at 163–165° C., $n_D^{25}$ 1.3952. The yield is 74%.

*Analysis.*—Calcd. for $C_6H_6ClF_3O_2$: Cl, 17.50. Found: Cl, 17.76.

STEP 2.—METHYL 2,3 3-TRIFLUORO-1-CYCLOBUTENE-1-CARBOXYLATE FROM METHYL 2-CHLORO-2,3,3-TRIFLUOROCYCLOBUTANECARBOXYLATE

In a glass reaction vessel fitted with stirrer, reflux condenser, and addition funnel are placed 303 parts of methyl 2 - chloro - 2,3,3 - trifluorocyclobutanecarboxylate and 350 parts of ether. One hundred sixty parts of triethylamine is added and the mixture is refluxed for one-half hour. Water (800 parts) is added and the ether layer is washed with 10% hydrochloric acid and water. After the ether solution is dried over magnesium sulfate, it is distilled to give 195 parts (79% yield) of methyl 2,3,3-trifluoro-1-cyclobutene-1-carboxylate, B. P. 128–129° C. $n_D^{25}$ 1.3850.

*Analysis.*—Calcd. for $C_6H_5F_3O_2$: C, 43.38; H, 3.03; F, 34.32. Found: C, 43.16, 43.20; H, 3.31, 3.42; F, 34.28.

STEP 3.—METHYL 3,3-DIFLUORO-2-METHOXY-1-CYCLOBUTENE-1-CARBOXYLATE FROM METHYL 2,3,3-TRIFLUORO-1-CYCLOBUTENE-1-CARBOXYLATE

A glass reaction vessel is fitted with stirrer, reflux condenser, device to add powder, and ice bath. In the vessel are placed 178 parts of methyl 2,3,3 - trifluoro - 1 - cyclobutene-1-carboxylate and 350 parts of anhydrous ether. Fifty-eight parts of solid sodium methylate is then added in portions. After all is added, the ice bath is removed and the mixture is stirred for one hour. The sodium fluoride is filtered off and rinsed with ether. The filtrate is distilled to give 114 parts (64% yield) of methyl 3,3-difluoro-2 - methoxy - 1-cyclobuetene-1-carboxylate, B. P. 179.5–181° C., $n_D^{25}$ 1.4302.

*Analysis.*—Calcd. for $C_7H_8F_2O_3$: C, 47.21; H, 4.53; F, 21.34. Found: C, 47.49; H, 4.59; F, 21.48.

STEP 4.—DIMETHYL 4,4-DIFLUORO-2-OXOGLUTARATE FROM METHYL 3,3-DIFLUORO-2-METHOXY-1-CYCLOBUTENE-1-CARBOXYLATE

A solution of 25 parts of methyl 3,3-difluoro-2-methoxy-1-cyclobutene-1-carboxylate in 130 parts of methylene chloride is cooled in a Dry Ice/acetone mixture and ozone is passed in until the blue color of ozone becomes evident. For decomposing the rather stable ozonide a simple still is arranged with a still pot in an oil bath maintained at 200° C. and an addition funnel in the still head. The ozonized solution is added slowly. Material collected in the receiver of the still is heated on a steam bath to evaporate methylene chloride and then returned to the still, after which all of it remains in the still pot. The product is distilled at 1 mm. in a simple still to get rid of considerable tar and then fractionated to give dimethyl 4,4-difluoro-2-oxoglutarate, B. P. 89–91° C./3 mm., $n_D^{25}$ 1.4064.

*Analysis.*—Calcd. for $C_7H_8F_2O_5$: C, 40.0; H, 3.84; F, 18.1. Found: C, 39.2; H, 4.01; F, 18.7.

The ozonide may also be decomposed by dissolving it in 98% acetic acid and carefully adding zinc dust. This gives a product, B. P. 86–88° C./1 mm., $n_D^{25}$ 1.4140, in 46% yield which is a mixture of dimethyl 4,4-difluoro-2-oxoglutarate and dimethyl 4,4-difluoro-2-hydroxyglutarate.

*Analysis.*—Found: C, 40.1; H, 4.85; F, 17.7.

The reduced form can be reoxidized to the keto form by the action of a mild oxidizing agent, such as N-bromosuccinimide.

4,4-difluoro-2-oxoglutaric acid is obtained from the ester by shaking with four parts of concentrated hydrochloric acid for 24 hours and removal of the hydrochloric acid under vacuum.

Trimethyl α,α-difluorooxalosuccinate and trimethyl α,α-difluoroisocitrate are prepared by the following reactions:

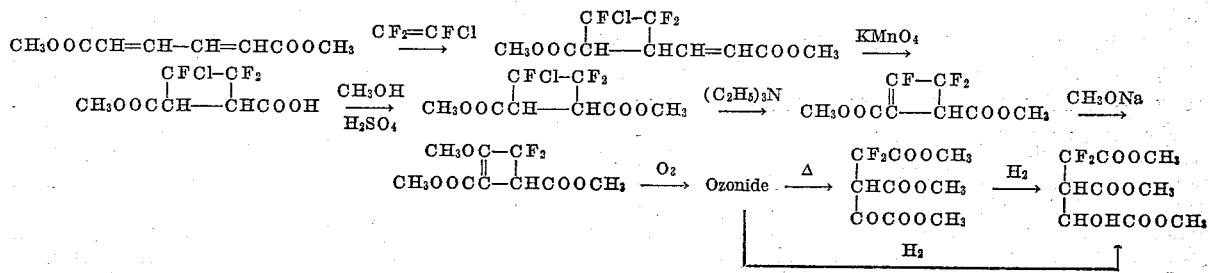

Example VI

STEP 1.—METHYL 3-(4-CARBOMETHOXY-3-CHLORO-2,2,3-TRIFLUOROCYCLOBUTYL)ACRYLATE

Dimethyl muconate (132 parts), 261 parts of benzene, 0.5 part of hydroquinone and 180 parts of chlorotrifluoroethylene are heated in a closed reactor for 8 hours at 190° C. The benzene is boiled off and the product is distilled under vacuum. The crude product is then fractionated through a column to give 47 parts (21% yield) of methyl 3-(4-carbomethoxy-3-chloro-2,2,3-trifluorocyclobutyl)-acrylate, B. P. 93–96°/2 mm., $n_D^{25}$ 1.4435.

*Analysis.*—Calcd. for $C_{10}H_{10}ClF_3O_4$: C, 41.90; H, 3.52; Cl, 12.37. Found: C, 41.84; H, 3.47; Cl, 12.05.

STEP 2.—DIMETHYL 3-CHLORO-3,4,4-TRIFLUOROCYCLOBUTANE-1,2-DICARBOXYLATE

To a stirred mixture of 138 parts of potassium permanganate, 16 parts of acetic acid and 800 parts of water maintained at 15–20° C. is slowly added 69 parts of methyl 3-(4-carbomethoxy-3-chloro-2,2,3-trifluorocyclobutyl)acrylate. The mixture is stirred one hour at the end and sulfur dioxide is then passed in with cooling until the manganese dioxide disappears. Hydrochloric acid (284 parts) is added and the solution is extracted with ether. The ether solution is dried with magnesium sulfate and evaporated to give the monoester of the desired product. The monoester is esterified by refluxing with 118 parts of methanol and 7 parts of sulfuric acid for 15 hours. The methanol is then distilled off, the ester is washed with water, dried, and distilled; yield, 26 parts (42%), B. P. 79–80° C./4 mm., $n_D^{25}$ 1.4105. The nuclear magnetic resonance spectrum of the compound is in accord with the structure.

*Analysis.*—Calcd. for $C_8H_8ClF_3O_4$: C, 36.87; H, 3.09; Cl, 13.61. Found: C, 37.48; H, 3.53; Cl, 13.90.

STEP 3.—DIMETHYL 1,4,4-TRIFLUOROCYCLOBUTENE-2,3-DICARBOXYLATE

To a solution of 26 parts of dimethyl 3-chloro-3,4,4-trifluorocyclobutane-1,2-dicarboxylate in 107 parts of ether is added 11 parts of triethylamine. Triethylamine hydrochloride immediately precipitates. After one-half hour this is filtered off. The ether solution is washed with 5% hydrochloric acid to remove excess triethylamine, then washed with water, dried and distilled. The yield of dimethyl 1,4,4-trifluorocyclobutene-2,3-dicarboxylate is 19 parts (88%) B. P. 49–51° C./1.5 mm., $n_D^{25}$ 1.4052. The nuclear magnetic resonance spectrum agrees with the structure.

*Analysis.*—Calcd. for $C_8H_7F_3O_4$: C, 42.88; H, 3.15; F, 25.44. Found: C, 42.07; H, 3.04; F, 24.95.

STEP 4.—DIMETHYL 1-METHOXY-4,4-DIFLUOROCYCLOBUTENE-2,3-DICARBOXYLATE

In a closed reaction vessel fitted with thermometer, stirrer and device for adding powder are placed 14.5 parts of dimethyl 1,4,4-trifluorocyclobutene-2,3-dicarboxylate and 71 parts of ether. Sodium methylate powder (3.8 parts) is gradually added while the solution is kept below 15° C. The mixture is stirred for 1 hour, the sodium fluoride is then filtered off, and the filtrate is distilled. The yield of dimethyl 1-methoxy-4,4-difluorocyclobutene-2,3-dicarboxylate is 11.7 parts (77%), B. P. 75–77° C./4 mm., $n_D^{25}$ 1.4378. The nuclear magnetic resonance spectrum agrees with the structure.

*Analysis.*—Calcd. for $C_9H_{10}F_2O_5$: C, 45.76; H, 4.27; F, 1609. Found: C, 45.30; H, 3.90; F, 15.62.

STEP 5.—TRIMETHYL α,α-DIFLUOROOXALOSUCCINATE

Dimethyl 1-methoxy-4,4-difluorocyclobutene-2,3-dicarboxylate is dissolved in 5 parts of methylene chloride and ozone is passed in at —75° C. The ozonide is decomposed by refluxing for 15 hours in methanol containing 2% of sulfuric acid. The methanol is distilled off, the product is washed with water, dried and distilled.

The ester is hydrolyzed to the free α,α-difluoro-β-oxalosuccinic acid by shaking for 2–10 days at 0–25° C. with 3.5 parts of hydrochloric acid (d. 1.18). Mild conditions are used because of the ease of decarboxylation of the free acid.

Example VII.—Trimethyl α,α-difluoroisocitrate

Trimethyl α,α-difluoroisocitrate is prepared by the hydrogenation of trimethyl α,α-difluorooxalosuccinate or the ozonide of dimethyl 1-methoxy-4,4-difluorocyclobutene-2,3-dicarboxylate in methanol or ether at 40–80° C. in the presence of ruthenium dioxide catalyst.

The free acid is prepared by refluxing the ester for three hours with 10% hydrochloric acid and extracting the α,α-difluoroisocitric acid with ether.

For use in biological processes, the α,α-difluoro-substituted acids in the tricarboxylic acid cycle can be employed as the free acids or in the form of their equivalent derivatives, such as their salts, amides and esters. Metal salts of these difluoro acids are readily formed by reaction of an aqueous solution of the free acid with a metal oxide, hydroxide or carbonate. For example, an aqueous solution of difluorooxalacetic acid is allowed to react with excess manganous carbonate, the excess is filtered off, and the soluble manganese salt is allowed to crystallize out by evaporation of the water. The copper, barium, zinc, iron, magnesium, mercury and lead salts are readily prepared in this way. The ammonium salts are prepared by treating an aqueous solution of the difluoro acid with ammonia until neutral and evaporating the solution.

Ester are prepared by refluxing a mixture of the difluoro acid and an alcohol, i. e., an alkanol, particularly of 1 to 8 or more carbon atoms such as methanol, ethanol, butanol, octanol and the like, in the presence of a trace of mineral acid. The esters of these difluoro acids, such as the alkyl esters are thus readily prepared.

Amides and N-substituted amides of these difluoro-substituted acids, such as the alkyl and dialkyl N-substituted amides, particularly wherein the alkyl groups are of 1 to 8 or more carbon atoms, are obtained by passing ammonia or a primary or secondary amine, such as an alkylamine or dialkylamine, i. e., methylamine, dimethylamine, octylamine, or dioctylamine and the like, into esters or acid chlorides of the difluoro acids. Thus, α,α-difluorooxalacetamide and the amides of these difluoro acids as well as the N-methyl, N-dimethyl, N-octyl, N-dioctyl, and other N-substituted amides of these difluoro acids are readily prepared. For example, difluorooxalacetamide is prepared by mixing diethyl difluorooxalacetate with aqueous ammonia, acidifying the solution, and extracting the amide with a water-immiscible solvent.

These α,α-difluoro derivatives of the acids in the tricarboxylic acid cycle are useful as fungicides as illustrated by their strong inhibition of tomato early blight (*Alternaria solani*). These α,α-difluoro acids are also useful as insecticides and miticides as illustrated by their toxicity to milkweed bugs, alphids, and two-spotted mites.

A 2% aqueous solution of α,α-difluorooxalacetic acid hydrate sprayed on milkweed bugs causes a 95% kill.

The preventive fungitoxic activity of diethyl-α,α-difluorooxalacetate is illustrated by the results of greenhouse tests with tomato plants as described by McCallan and Wellman (Crop Protection Digest, Bulletin 68, July 1943, pages 94–134). In such a test one set of tomato plants is sprayed with a 0.0016% aqueous solution of diethyl α,α-difluorooxalacetate and another set is sprayed with a 0.2% aqueous solution of diethyl α,α-difluorooxalacetate. The treated plants, along with a corresponding set of untreated controls, are inoculated with tomato early blight (*Alternaria solani*). Lesion counts are made after three days. The control plants show 100% disease, the plants treated with 0.0016% diethyl α,α-difluorooxalacetate show 9% disease, and the plants sprayed with 0.2% diethyl α,α-difluorooxalacetate show no disease.

The approximate $LD_{50}$ of diethyl α,α-difluorooxalacetate for laboratory white mice (intraperitoneal route) is 50–75 mg./kg. of body weight.

In the test against tomato early blight as described above, plants sprayed with a 0.2% aqueous solution of 3,3-difluoromalic acid show 4% disease compared to 100% for controls. The approximate $LD_{50}$ of 3,3-difluoromalic acid for laboratory white mice (intraperitoneal route) is 50–75 mg./kg.

In the test against tomato early blight as described above, plants sprayed with 0.2% triethyl 2,2-difluorocitrate in 90:10 acetone:water show 4% disease compared to 100% disease for the controls.

In the test against tomato early blight, plants sprayed with a 0.2% aqueous solution of 2,2-difluorosuccinic acid show 6% disease compared to 100% for controls. A 2% solution sprayed on aphids causes a 90% kill and on two-spotted mites produces a 100% kill. The approximate $LD_{50}$ of 2,2-difluorosuccinic acid for laboratory white mice (intraperitoneal route) is 100–150 mg./kg.

Furthermore, the insecticidal and miticidal activity of these new compounds is surprisingly greater than that of known compounds which are related in structure. For example, $\alpha,\alpha$-difluorosuccinic acid is several fold more effective in these respects than tetrafluorosuccinic acid or $\alpha,\alpha$-difluoroglutaric acid as shown in the following table:

COMPARATIVE TOXICITY TO APHIDS AND MITES PERCENT KILL WHEN SPRAYED AT 0.2% CONC. IN WATER

|  | $\alpha,\alpha$-Difluorosuccinic Acid | Tetrafluorosuccinic Acid | $\alpha,\alpha$-Difluoroglutaric Acid |
|---|---|---|---|
| Aphids | 90 | 22 | 4 |
| Mites | 100 | 34 | 20 |

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A fluorine-containing compound selected from the class consisting of acids of the tricarboxylic acid cycle having a methylene carbon atom alpha to a carboxyl group and having directly attached to this methylene carbon atom two fluorine atoms, their metal and ammonium salts, their alkyl esters wherein the alkyl group contains 1 to 8 carbon atoms, their amides and their N-alkyl and N-dialkyl substituted amides wherein the alkyl groups contain 1 to 8 carbon atoms.

2. An acid of the tricarboxylic acid cycle having a methylene carbon atom alpha to a carboxyl group and having directly attached to this methylene carbon atom two fluorine atoms.

3. An alkyl ester of an acid of the tricarboxylic acid cycle having a methylene carbon atom alpha to a carboxyl group and having directly attached to this methylene carbon atom two fluorine atoms, said alkyl group containing 1 to 8 carbon atoms.

4. Diethyl $\alpha,\alpha$-difluorooxalacetate.
5. Diethyl $\alpha,\alpha$-difluorocitrate.
6. $\alpha,\alpha$-Difluorocitric acid.
7. $\alpha,\alpha$-Difluorosuccinic acid.

References Cited in the file of this patent

UNITED STATES PATENTS 2,426,224     Kharasch _____ Aug. 26, 1947

OTHER REFERENCES

Peters et al.: J. Physiol., v. 119 (1953), pp. 421–7.
Rivett: J. Chem. Soc. (London), 1953, pp. 3710–1.
Morrison et al.: Biochem. J. (Proc.), v. 56 (1954), pp. XXXVI–VII.